United States Patent

Fuchi

[11] Patent Number: 5,923,436
[45] Date of Patent: Jul. 13, 1999

[54] FACSIMILE MACHINE

[75] Inventor: Masami Fuchi, Osaka, Japan

[73] Assignee: Mita Industrial Co., Ltd., Osaka, Japan

[21] Appl. No.: 08/816,892

[22] Filed: Mar. 13, 1997

[30] Foreign Application Priority Data

Mar. 13, 1996 [JP] Japan .................................... 8-085660

[51] Int. Cl.$^6$ .................................................. H04N 1/00
[52] U.S. Cl. .......................... 358/400; 358/401; 358/402; 358/404; 358/406; 358/407; 358/409; 358/413; 358/440; 358/442
[58] Field of Search .................................... 358/400, 404, 358/401, 402, 406, 407, 409, 413, 440, 442

[56] References Cited

U.S. PATENT DOCUMENTS

| | | | |
|---|---|---|---|
| 4,939,541 | 7/1990 | Sugiura | 355/202 |
| 5,001,572 | 3/1991 | Hashimoto et al. | 358/440 |
| 5,173,785 | 12/1992 | Muramatsu | 358/400 |
| 5,177,620 | 1/1993 | Fukushima | 358/404 |
| 5,185,788 | 2/1993 | Matsumoto et al. | 379/357 |
| 5,239,386 | 8/1993 | Ishiwatari et al. | 358/440 |
| 5,248,139 | 9/1993 | Garland et al. | 271/184 |
| 5,547,179 | 8/1996 | Wilcox et al. | 271/3.2 |

*Primary Examiner*—Jose L. Couso
*Assistant Examiner*—Kanji Patel
*Attorney, Agent, or Firm*—Antonelli, Terry, Stout & Kraus, LLP

[57] ABSTRACT

A facsimile machine includes a machine housing; an upper guide member disposed above the machine housing and adapted to be movable between an operating position, in which a document transport path is formed, and an open position, in which the document transport path is opened; an operating panel mounted on the top of the upper guide member and provided with dial number call keys for calling previously stored dial numbers of destinations, and a function switching key for selecting from two alternative call dial numbers stored for each of the dial number call keys; and a key switching plate having openings through which the key heads of the dial number call keys are exposed with the key switching plate disposed on the operating panel so as to be invertible between a first position and a second position and adapted to move the function switching key in a switching manner upon the inversion thereof. The key switching plate is adapted to be located at the same one of the first and second positions each time the upper guide member is brought to the open position.

3 Claims, 6 Drawing Sheets

FACSIMILE MACHINE

FIELD OF THE INVENTION

This invention relates to a facsimile machine adapted to transmit and receive an image made on a document.

DESCRIPTION OF THE PRIOR ART

A facsimile machine generally has a document table disposed above a machine housing, and is constituted such that while a document placed on the document table is being conveyed through a document transport path, an image that has been made on the document and that is to be transmitted is read by an image reading means.

In the facsimile machine of this constitution, an upper guide member making up part of the document transport path is openable to remove a jammed document in the document transport path, or to facilitate maintenance.

The facsimile machine is also provided with an operating panel where various keys for transmitting operation instructions are disposed. This operating panel is provided on the top of the upper guide member so as not to interfere with the feed or discharge of a document being transmitted or the discharge of a transfer sheet during receipt. On the operating panel, there are disposed various function keys, such as dial number keys; a plurality of automatic dial call keys (so-called one-touch keys for abbreviated address calling) for calling stored dial numbers of destinations; keys for setting the image quality of the document to be transmitted; a redial key for calling a previously dialed destination again; a conversation reserve key; and function keys for function setting to be employed when using the redial key concurrently as a pause key for entering a blank time between adjacent dial numbers, or when using the conversation reserve key concurrently as a clear key.

Of these various function keys disposed on the operating panel, the plurality of dial call keys which permit one-touch calling of the dial numbers of the destinations are desirable for facilitating a transmission operation by the facsimile machine. However, there are limitations in disposing these dial call keys on the operating panel due to the limited space of the upper guide member. Currently, only about 10 to 20 dial call keys can be disposed, in addition to the dial number keys, the redial key, and so on.

To solve this problem of the limited number of function keys disposed, a proposal has been made for a machine of the type in which a function switching key is provided, and a key function switching plate, having openings allowing the heads of the dial call keys to be exposed to the outside, is disposed so as to be invertible between a first position and a second position; and in which the function switching key is actuated in a switching manner by the inversion of the key function switching plate, whereby twice as many dial numbers as the number of dial call keys can be called in a one-touch manner.

The facsimile machine is adapted to open the document transport path if a document jam occurs there. When the operating condition is restored after opening the document transport path, the key function switching plate should desirably be located at a known one of the first and second positions without fail, no matter which of the first and second positions the key function switching plate was at before then. More concretely, when the dial call keys work with a key function switching plate that is in a selected one of its two positions, the dial call keys are generally preferably set at the dial numbers with the higher frequency of use.

Thus, it is preferred that when the operating condition is restored after opening the document transport path, the key function switching plate is always put to the one of these positions whose frequency of use is higher.

SUMMARY OF THE INVENTION

A principal object of this invention is to provide a facsimile machine in which the key function switching plate is always put to the same one of its positions when the upper guide member, constituting part of the document transport path and mounted with the operating panel, is opened for clearing of a jam.

To attain this principal object, the present invention provides a facsimile machine comprising a machine housing; an upper guide member disposed above the machine housing and adapted to be movable between an operating position, in which a document transport path is formed, and an open position, in which the document transport path is opened; an operating panel mounted on the top of the upper guide member and provided with dial number call keys for calling previously stored dial numbers of destinations, and a function switching key for selecting from two alternative dial numbers stored for each of the dial number call keys; and a key switching plate having openings through which the key heads of the dial number call keys are exposed, with the key switching plate disposed on the operating panel so as to be invertible between a first position and a second position and adapted to move the function switching key in a switching manner upon the inversion thereof; wherein:

the key switching plate is adapted to be located at the same one of the first and second positions each time the upper guide member is brought to the open position and then returned to the operating position.

The invention also provides a facsimile machine in which the upper guide member is pivotably mounted on the machine housing by a support shaft, and the key switching plate has one side pivotably supported by support spindles disposed on an axis parallel to the support shaft.

DETAILED DESCRIPTION OF PREFERRED EMBODIMENTS

The invention will now be described in detail by reference to the attached drawings that show preferred embodiments of a facsimile machine constructed according to the invention.

Figure 1:
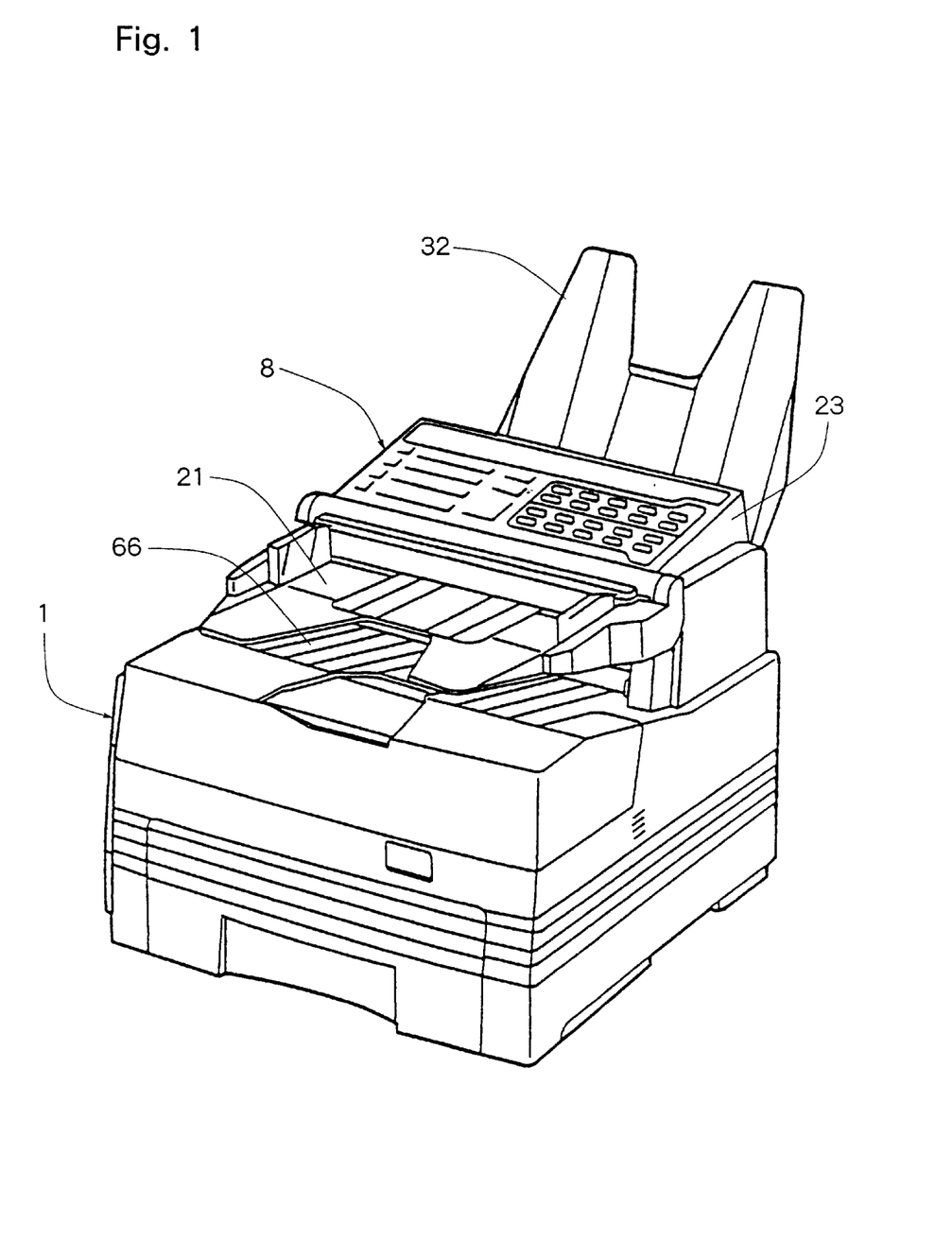
FIG. 1 is a perspective view of a facsimile machine constructed in accordance with the present invention.
Figure 2:
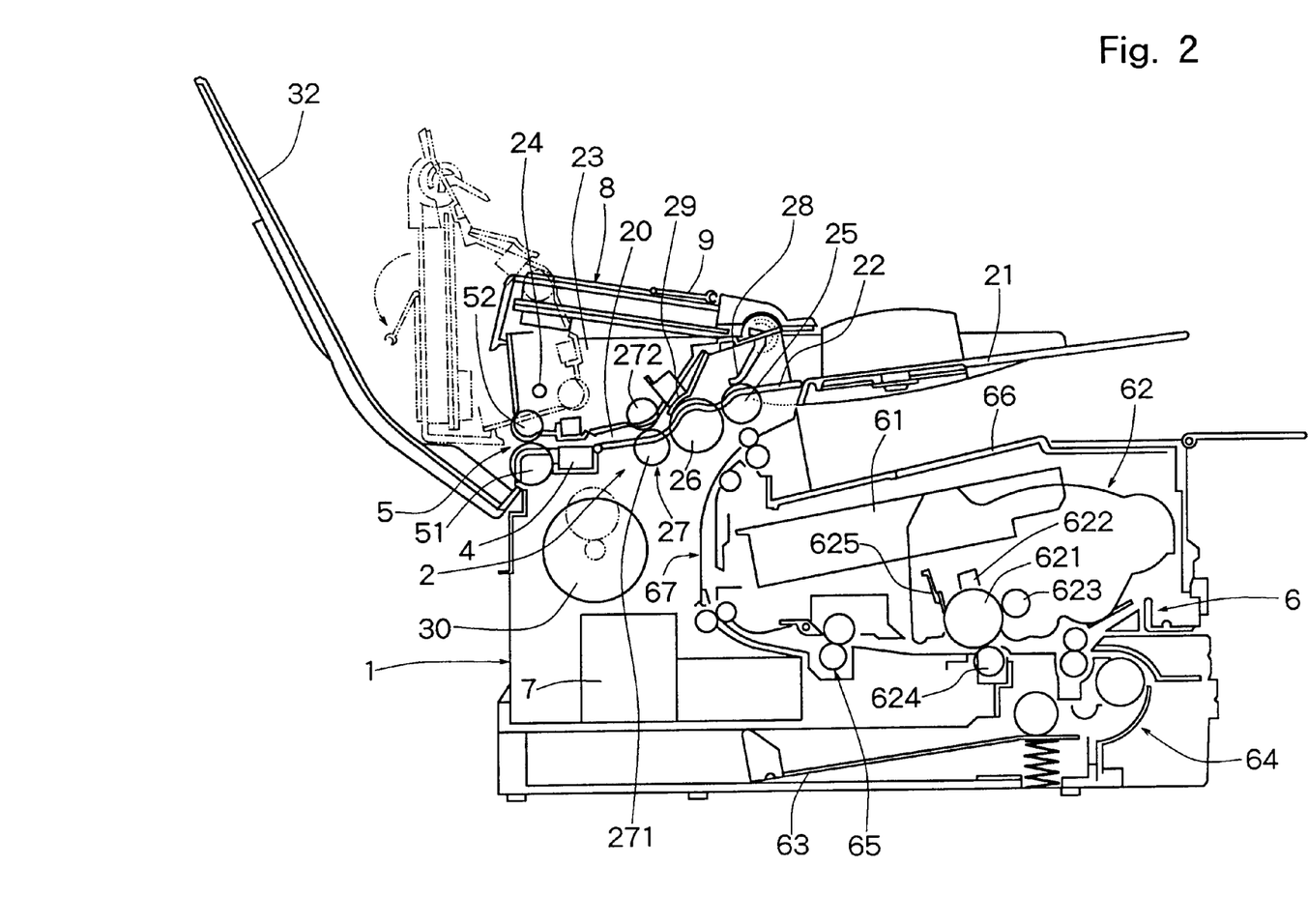
FIG. 2 is a schematic structural sectional view of the facsimile machine shown in FIG. 1.
Figure 3:
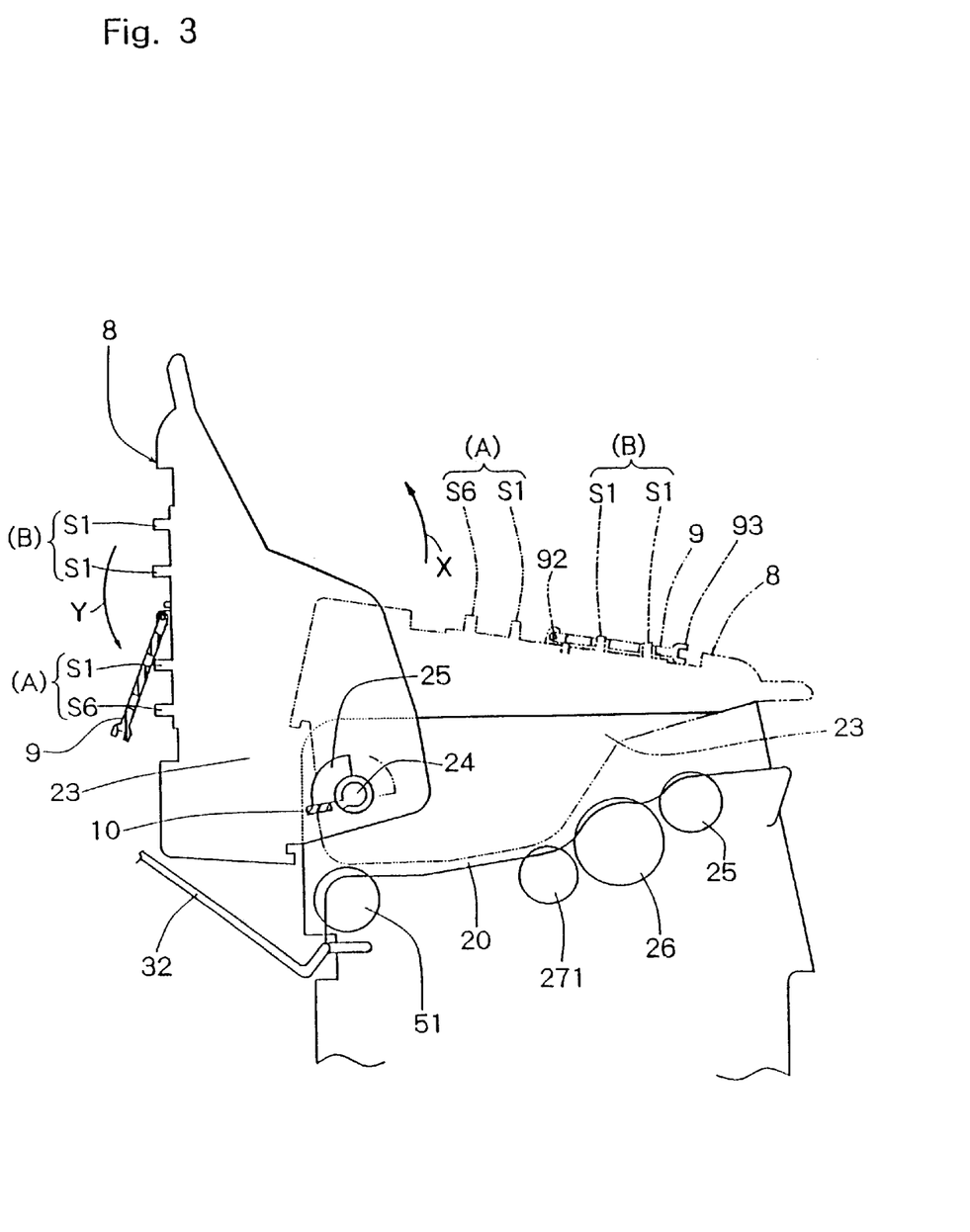
FIG. 3 is an explanatory drawing for illustrating the open status of an upper guide member constituting part of a document transport path in the facsimile machine shown in FIG. 1.

FIG. 1 is a perspective view of a facsimile machine constructed in accordance with the invention. FIG. 2 is a schematic structural sectional view of the facsimile machine shown in FIG. 1.

The illustrated facsimile machine has a machine housing 1. In the machine housing 1, there are disposed a document feed means 2 for feeding a document whose image is to be transmitted; an image read means 4 for reading an image previously made on the document fed by the document feed means 2; a document discharge means 5 for discharging the document whose image has been read by the image read means 4; a print means 6 for printing a received image; and a control means 7 for controlling transmission based on image data read by the image read means 4 and transmit information from an operating panel, to be described later, as well as for controlling the print means 6 based on a received signal.

The document feed means 2 has a document table 21 disposed above the machine housing 1. Ahead of the document table 21, in the direction of document transport, there is provided a document transport path 20 composed of a guide plate 22 and an upper guide member 23. The upper guide member 23, constituting an upper guide of the document transport path 20, is pivotably supported by a support shaft 24 which is disposed so as to extend in the width direction of the machine housing (the direction perpendicular to the sheet face of FIG. 2). Thus, the upper guide member 23 is free to pivot between an operating position that is indicated by solid lines in FIG. 2 and an open position that is indicated by two-dot chain lines in FIG. 2.

Below the guide plate 22 which partially defines the document transport path 20, a forwarding roller 25, a feed roller 26, and a drive roller 271, which is one roller of a transport roller pair 27, are disposed in this order from the upstream side in the direction of document transport. These respective rollers are partially projected into the document transport path 20 through an opening (not shown) provided in the guide plate 22. In the guide plate 22 and downstream from the transport roller pair 27 in the direction of document transport, the image read means 4 is disposed. Downstream from the image read means 4 in the direction of document transport, and below the guide plate 22, a drive roller 51 is disposed and is one roller of a discharge roller pair which constitute the document discharge means 5. This drive roller 51 is also partially projected into the document transport path 20 through the opening (not shown) provided in the guide plate 22.

In the upper guide member 23, and also partially defining the document transport path 20, there are disposed a document press plate 28 paired up with the forwarding roller 25, a separating pad 29 paired up with the feed roller 26, and a driven roller 272 which is the second roller of the transport roller pair 27. In the upper guide member 23, there is also disposed a driven roller 52 which is the second roller of the discharge roller pair.

The forwarding roller 25, feed roller 26, drive roller 271, and drive roller 51 are adapted to be driven via a power transmission mechanism (not shown) by the drive force of a stepping motor 30, which constitutes a drive source.

The image read means 4 is composed of a CCD (charge coupled device) line image sensor in the illustrated embodiment. This image read means 4 makes a relative scan of the document fed by the document feed means 2 to read the image on the document line by line in the direction of document transport (the direction of the rows on the document), and sends the read data to the control means 7.

The document whose image data has been read by the image read means 4 is discharged onto a document discharge tray 32, disposed on the document discharge side of the machine housing 1, by the discharge roller pair 51, 52 that constitute the document discharge means 5.

Next, the print means 6 will be described with reference to FIG. 2.

The print means 6 comprises an optical system unit 61 which, based on a print command from the control means 7, converts received image data into an optical signal, issues this signal, and forms a latent electrostatic image on a photosensitive layer of a photoconductor drum to be described later; an imaging unit 62 for developing the latent electrostatic image, that has been formed on the photosensitive layer of the photoconductor drum by the optical system unit 61, into a toner image; a transfer sheet feed means 64 for supplying sheets of transfer paper housed in the cassette case 63 to the imaging unit 62; a fixing unit 65 for heat-fixing the toner image that has been printed by the imaging unit 62 onto the transfer sheet supplied by the transfer sheet feed means 64; and a transfer sheet discharge means 67 for conveying the transfer sheet, that has the toner image fixed on it by the fixing unit 65, onto a transfer sheet discharge tray 66.

The imaging unit 62 comprises a photoconductor drum 621 having a photosensitive layer on the outer periphery thereof; a charging unit 622 for charging the photosensitive layer of the photoconductor drum 621 to a specific potential; a development unit 623 for developing a latent electrostatic image, which has been formed by the optical system unit 61 on the photosensitive layer of the photoconductor drum 621 charged by the charging unit 622, to a toner image; a transfer unit 624 for transferring the toner image, formed on the outer peripheral surface of the photoconductor drum 621 by the development unit 623, to a transfer sheet; and a cleaning unit 625 for removing toner remaining on the outer peripheral surface of the photoconductor drum 621 after transfer.

The facsimile machine constructed above works in the manner described below.

When images on documents are to be transmitted, the documents are set on the document table 21 such that their image surfaces face downward, and transmit information is entered from the operating panel to be described later. Based on this transmit information, the control means 7 sends a control signal to the stepping motor 30 to drive the stepping motor 30. Upon the driving of the stepping motor 30, the forwarding roller 25, feed roller 26, drive roller 271, and drive roller 51 are rotationally driven via the power transmission mechanism (not shown). Thus, the documents set on the document table 21 are sequentially delivered by the forwarding roller 25 to the document transport path 20, starting with the bottom-most document. Then, the documents are conveyed along the document transport path 20 by the feed roller 26, transport roller pair 27 and document discharge means 5 until their discharge onto the document discharge tray 32. While the documents are traveling in the document transport path 20 and passing by the image read means 4, the image read means 4 reads the images of the documents and sends image signals to the control means 7. The control means 7 performs data processing of the image signals, and transmits the results via a data transmission unit (not shown) to a receiving facsimile machine designated from the operating panel.

Next, the receive action of the inventive facsimile machine will be described.

Upon receipt of an image signal from the outside via a data transmission unit (not shown), the control means 7 processes the image signal in a predetermined manner to create print data. Then, the control means 7 sends the print data to the optical system unit 61 and actuates the imaging unit 62, transfer sheet feed means 64 and transfer sheet discharge means 67. The optical system unit 61 converts the print data sent from the control means 7 to an optical signal and illuminates the outer peripheral surface of the photoconductor drum 621 with this signal, thereby forming a latent electrostatic image. The latent electrostatic image formed on the outer peripheral surface of the photoconductor drum 621 is developed to a toner image by the development unit 623. The toner image formed on the outer peripheral surface of the photoconductor drum 621 is transferred onto a transfer sheet supplied by the transfer sheet feed means 64 when the transfer sheet passes beside the transfer unit 624. The transfer sheet having the toner image transferred onto it is carried to the fixing unit 65, where the toner image is heat-fixed. Then, the transfer sheet having the toner image fixed on it, is conveyed by the transfer sheet discharge means 67 and is discharged onto the transfer sheet discharge tray 66.

The facsimile machine in the illustrated embodiment also has a copy function, and its copy action will be described next.

When documents are to be copied, the documents are set on the document table 21 such that their image surfaces to be copied face downward, as in the transmission of the document images, and a copy mode is commanded from the operating panel. A control signal from the control means 7 is based on this copy command and drives the stepping motor 30. Upon driving of the stepping motor 30, the forwarding roller 25, feed roller 26, drive roller 271, and drive roller 51 are rotationally driven, as in the above-described manner. Thus, the documents set on the document table 21 are sequentially discharged onto the document discharge tray 32 through the document transport path 20, starting with the bottom-most document. While the documents are passing by the image read means 4, the image read means 4 reads the images on the documents, and sends image signals to the control means 7. The control means 7 data-processes the image signals to create print data. Then the control means 7 sends the print data to the optical system unit 61 and actuates the imaging unit 62, transfer sheet feed means 64 and transfer sheet discharge means 67. By the action of these parts, the print data supplied to the optical system unit 61 is printed onto the transfer sheet as in the case of the aforementioned receive action.

On the top of the upper guide member 23 of the facsimile machine constructed as above, the operating panel 8 is disposed and has various keys for commanding the receive action and copy action, as well as actions for various other functions that have been stored.

A description of the operating panel 8 will be offered by reference to FIGS. 3 to 6.

Figure 5:
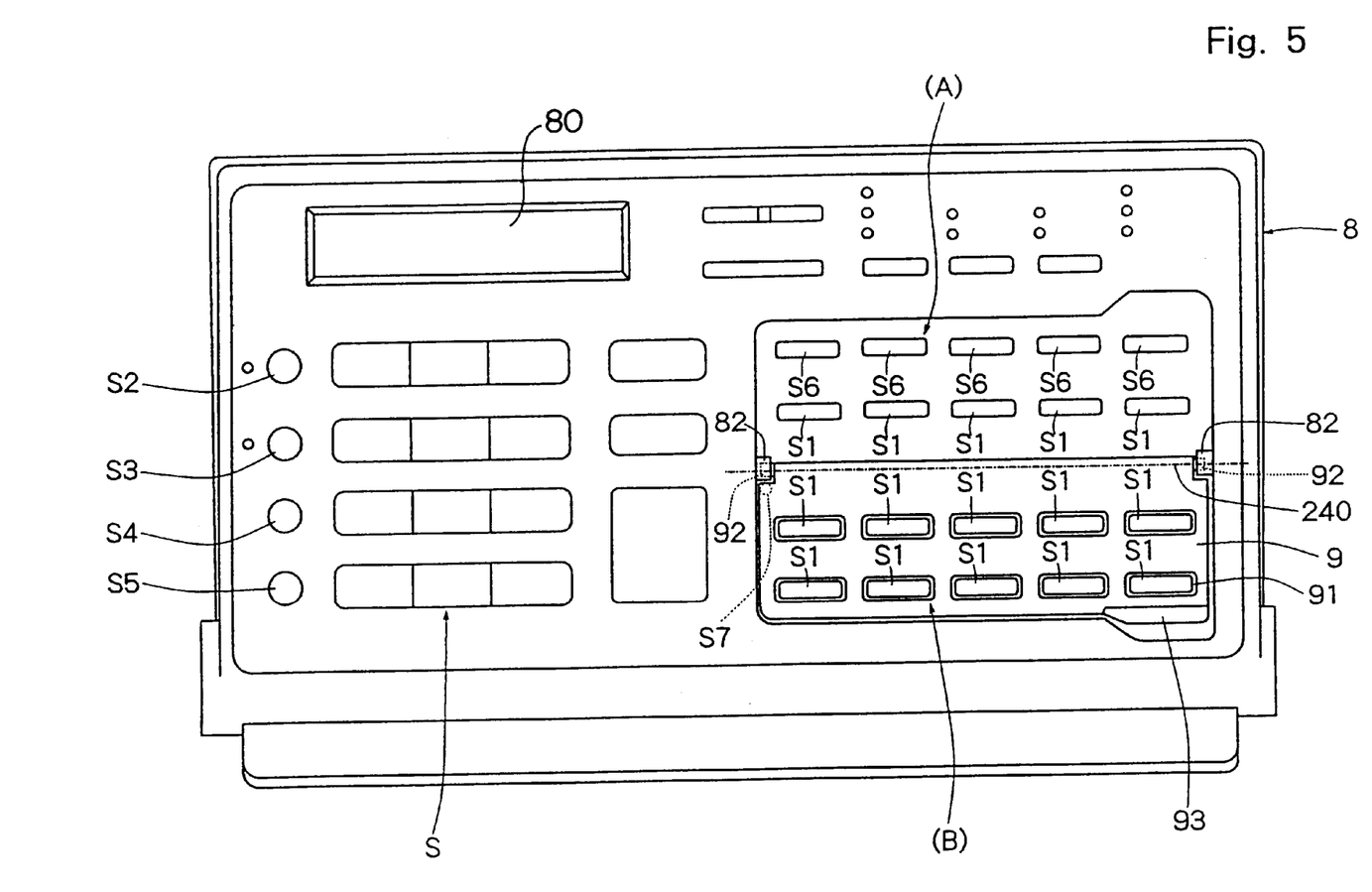
FIG. 5 is a plan view of an operating panel disposed on the upper guide member constituting part of the document transport path in the facsimile machine shown in FIG. 1.

As shown in FIG. 5, the operating panel 8 has, for example, a group of numbered dial keys S, a plurality of dial call keys S1 for calling the previously stored dial numbers of destinations (so-called one-touch keys for abbreviated address calling), a memory transmit key S2, a conversation reserve key S3 for concurrent use as a clear key, a redial key S4 for concurrent use as a pause key, a telephone directory key S5 for showing telephone numbers on a display 80 and concurrently used as an abbreviated address call key, and various keys S6 for screen switching, transmit/receive report output, sequential broadcast, and time setting. In the illustrated embodiment, 15 of the dial call keys S1 and 5 of the various keys S6 for screen switching, etc. are disposed.

Figure 4:
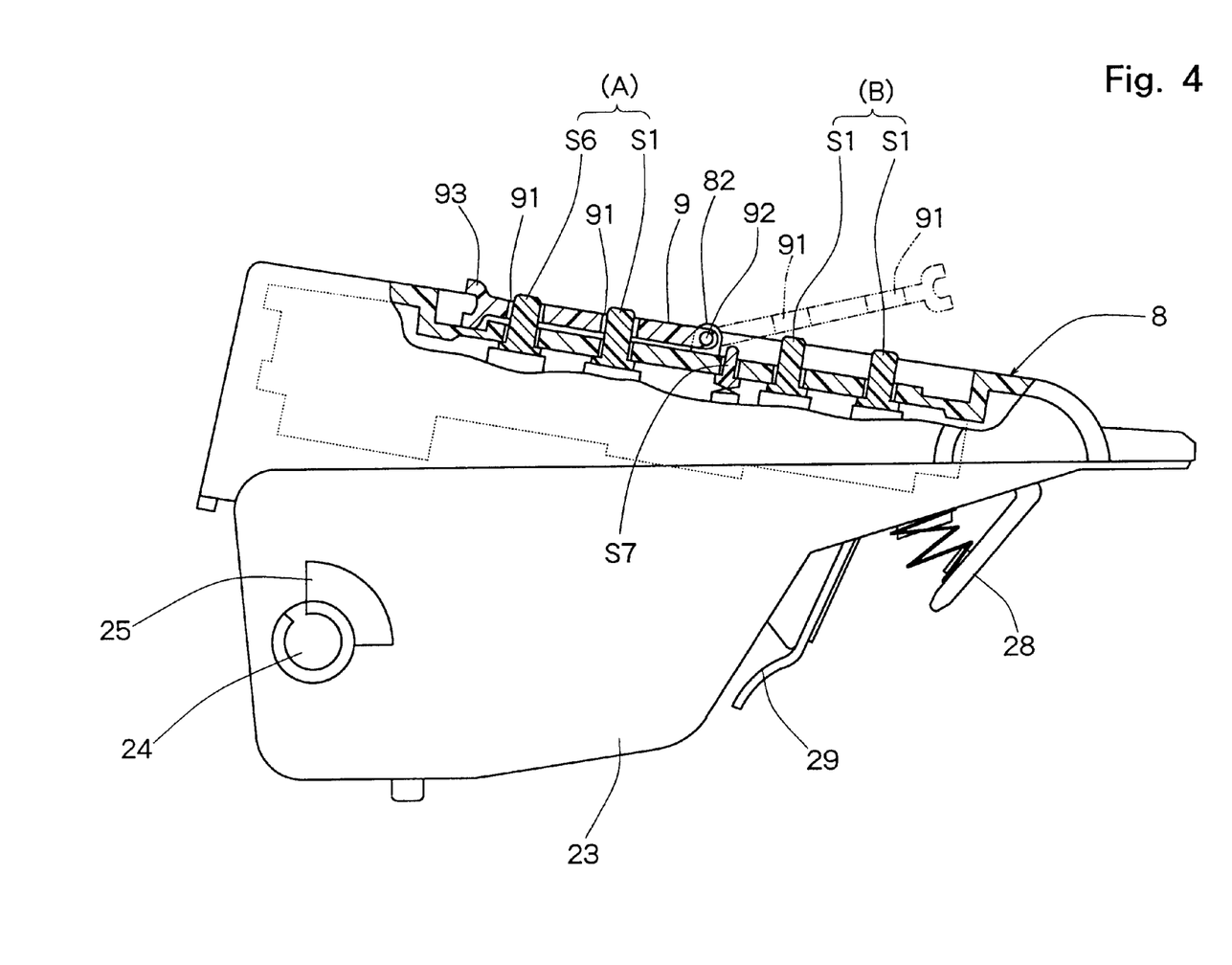
FIG. 4 is a side view, partially broken away, of an essential part of the upper guide member constituting part of the document transport path in the facsimile machine shown in FIG. 1.

These keys are arranged in 4 rows, 5 keys in each row, along an axis 240 parallel to the support shaft 24 (FIGS. 2, 4). Concretely, these keys are arranged such that, as depicted in FIG. 5, five of the various keys S6 and five of the dial call keys S1 are disposed above the axis 240, while ten of the dial call keys S1 are disposed below the axis 240. A group of keys, (A), consisting of the five various keys S6 and the five dial call keys S1 disposed above the axis 240, and a group of keys, (B), consisting of the ten dial call keys S1 disposed below the axis 240, are arranged symmetrically with respect to the axis 240.

On the operating panel 8, a function switching key S7 is disposed near the axis 240. The switching operation of the function switching key S7 enables a single dial call key S1 to selectively call the stored dial numbers of either one of two destinations. In the illustrated embodiment, one of the dial call keys S1 which is in the key group (B) is adapted to perform as a function key S8 (see FIG. 6) for function setting when the function switching key S7 is switched. In the illustrated embodiment, therefore, it is possible to call, in a one-touch manner, the dial number of any one of a number of destinations equivalent to twice the 15 dial call keys S1 minus 1 (15×2−1) that is, the dial numbers of 29 destinations. Furthermore, the five keys S6 for screen switching that are arranged in the key group (A) may be provided with the function to call the dial numbers of destinations by switching the function switching key S7. This permits the dial numbers of a total of 34 destinations to be called one-touch.

Figure 6:
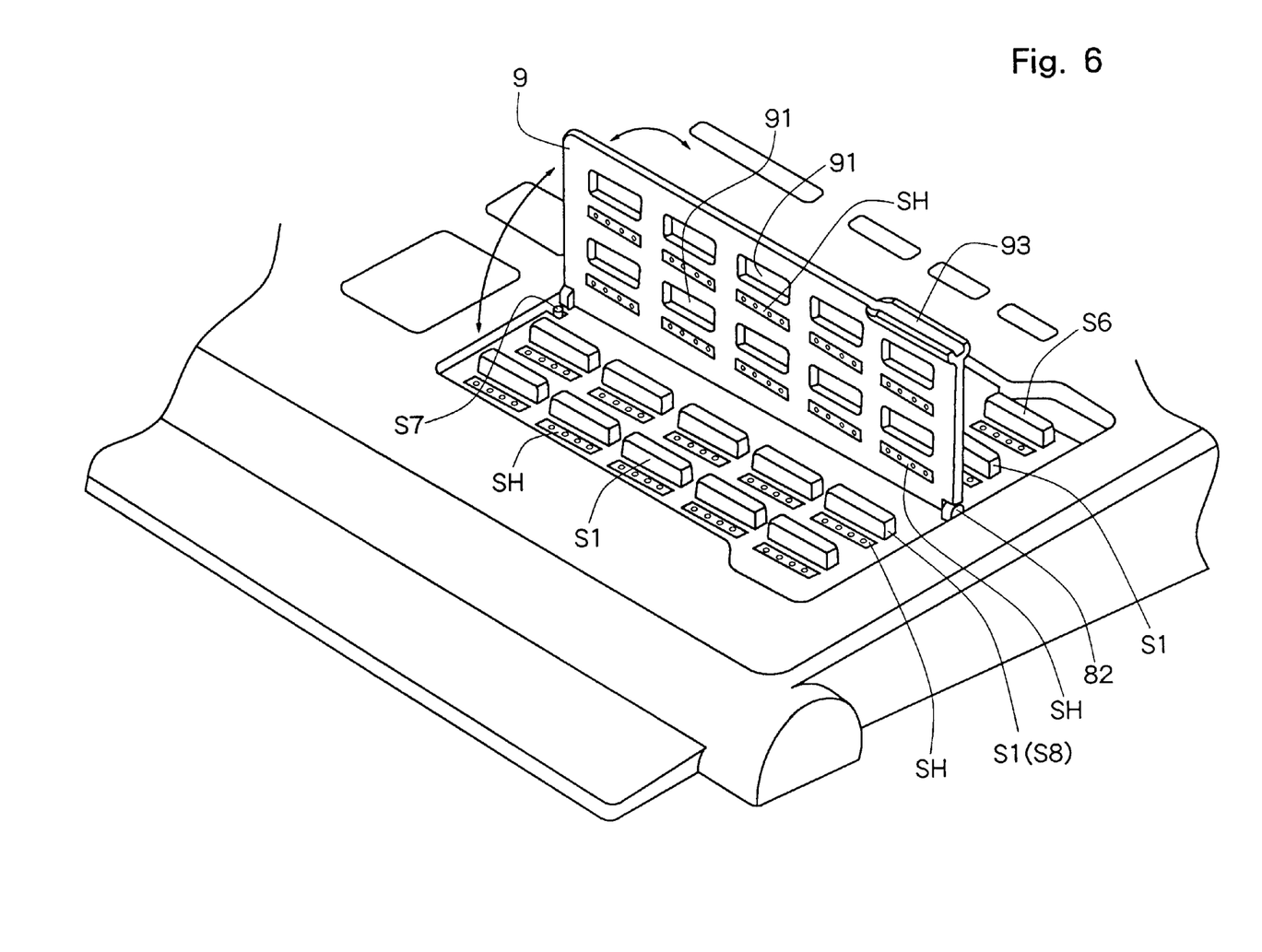
FIG. 6 is a perspective view of an essential part of the operating panel shown in FIG. 5.

The function switching key S7 can be switched by inverting a key function switching plate 9. In the illustrated embodiment, the key function switching plate 9 has ten openings 91 through which the heads of the dial call keys S1 and the various keys S6 for screen switching are exposed to the outside. At both ends of one side of the key function switching plate 9, support spindles 92, 92 are formed integrally. These support spindles 92, 92 are pivotably supported by support members 82, 82 provided on the axis 240 of the operating panel 8. At the right-hand end part in FIG. 5 of the other side of the key function switching plate 9, a handle portion 93 is provided. The so constituted key function switching plate 9, in the state indicated by solid lines in FIG. 4, is positioned on the key group (A) side of operating panel 8 as a first position, and allows the heads of the keys in the key group (A) to be exposed to the outside through the ten openings 91. In this state, the key function switching plate 9 is separated from the function switching key S7. The key function switching plate 9 located at the first position indicated by solid lines in FIG. 4 pivots about the support spindles 92, 92 when a finger is engaged with the handle portion 93 to bring the other side of plate 9 upwards. FIG. 6 depicts the key function switching plate 9 mid-way through this pivoting. The key function switching plate 9 is further pivoted from the state shown in FIG. 6 until it is inverted, whereby it is positioned on the key group (B) side of operating panel 8 as a second position, as illustrated in FIG. 5. In the second state shown in FIG. 5, the key function switching plate 9 allows the heads of the keys in the key group (B) to be exposed to the outside through the ten openings 91. In this state, the key function switching plate 9 depresses the function switching key S7, switching the function switching key S7. On both of the face and back of the key function switching plate 9 and on the top of the operating panel 8, displays SH of key functions corresponding to the various keys including the dial call keys S1, are provided as shown in FIG. 6 so that after the key function is confirmed visually, the key can be operated.

The operating panel 8, mounted on the upper guide member 23 disposed above the machine housing 1 in the illustrated embodiment, has the constitution described above. Its operation will be described below.

While the key function switching plate 9 is positioned on the key group (A) side of operating panel 8, in the first position, as shown in FIG. 4, it is possible to call, for example, the more frequently used dial numbers of the dial numbers of two destinations that have been stored for each dial call key S1. Then, from the state of the key function switching plate 9 located at the first position shown in FIG. 4, the handle portion 93 is hooked with a finger, and the other side of the key function switching plate 9 is brought upwards. The key function switching plate 9 is pivoted about the support spindles 92, 92, and further pivoted from the state shown in FIG. 6 until it is inverted, whereupon it is positioned on the key group (B) side, in the second position illustrated in FIG. 5. In this condition, it is possible to call, for example, the less frequently used dial numbers of the dial numbers of the two destinations that have been stored for the dial call key S1.

Assume, here, that a document jam occurs in the document transport path 20 while the key function switching plate 9 is lying on the key group (B) side, the second position. When the upper guide member 23 is pivoted about the support shaft 24 in the direction of the arrow X show in FIG. 3 in order to clear this jam, the document transport path 20 is opened. At the open position indicated by the solid line in FIG. 3, an engagement portion 25 provided on the upper guide member 23 contacts a stopper 10 provided on the machine housing 1, restraining the rotation of the upper guide member 23. The angle of opening of the upper guide member 23 is set at an angle at which while the upper guide member 23 is kept at the open position shown by the solid line in FIG. 3, the key function switching plate 9, even if originally positioned on the key group (B) side, the second position, pivots as shown by arrow Y in FIG. 3 and is inverted about the support spindles 92, 92 toward the key group (A) side, the first position, due to its own weight and is headed downward.

After the document transport path 20 has been opened by moving the upper guide member 23 to the open position for clearing of a jam, the upper guide member 23 is returned to the operating position shown in FIG. 1 to close the document transport path 20. As a result, the key function switching plate 9 is then positioned on the key group (A) side, the first position, no matter which position it was located at before then, the key group (A) side, the first position, or the key group (B) side, the second position. Thus, the key function switching plate 9 takes the position on the key group (A) side as its home position. In the illustrated embodiment, with the key function switching plate 9 positioned on the key group (A) side as described above, the more frequently used dial numbers can be called out of the dial numbers of the two destinations that have been stored for each dial call key S1. Therefore, the facsimile machine can be used more conveniently.

What I claim is:

1. A facsimile machine comprising:

a machine housing; an upper guide member pivotably mounted on said machine housing for pivoting between an operating position, in which a document transport path is formed, and an open position in which the document transport path is opened;

an operating panel mounted on said upper guide member and provided with dial number call keys for calling previously stored dial numbers of destinations, and a function switching key for selecting from two alternative dial numbers stored for each of said dial number call keys; and a key switching plate having openings through which key heads of said dial number call keys are exposed, said key switching plate pivotably mounted on said operating panel so as to be invertible between a first position and a second position and adapted to move said function switching key in a switching manner upon inversion of said key switching plate; wherein, said key switching plate is adapted to be located at the same one of the first and second positions each time said upper guide member is pivoted to the open position.

2. The facsimile machine of claim 1, further comprising a support shaft disposed on said machine housing, and support spindles disposed on said operating panel on an axis parallel to said support shaft, and wherein said upper guide member is pivotably mounted on said support shaft, and said key switching plate has one side pivotably supported by said support spindles.

3. A facsimile machine comprising:

a machine housing;

a support shaft disposed on said machine housing;

an upper guide member pivotably mounted on said support shaft for pivoting between an operating position, in which a document transport path is formed, and an open position in which the document transport path is opened;

an operating panel mounted on said upper guide member and provided with dial number call keys for calling previously stored dial numbers of destinations, and a function switching key for selecting from two alternative dial numbers stored for each of said dial number call keys;

support spindles disposed on said operating panel on an axis parallel to said support shaft; and a key switching plate pivotally mounted on said support spindles for pivoting to invert said key switching plate between a first position and a second position, said key switching plate having openings through which key heads of said dial number call keys are exposed, wherein:

said key switching plate is adapted to move said function switching key in a switching manner upon inversion of said key switching plate; and each time said upper guide member is pivoted to the open position, said key switching plate pivots about said support shaft to an inverted position due to its own weight and is headed downward and is brought to the same one of the first and second positions.

\* \* \* \* \*